United States Patent
Choi

(10) Patent No.: US 6,943,672 B2
(45) Date of Patent: Sep. 13, 2005

(54) WARNING APPARATUS FOR SIGNALING WEAR AND TEAR OF TIMING BELT IN ENGINE

(75) Inventor: Young-Ho Choi, Jeollabuk-do (KR)

(73) Assignee: Hyundai Motor Company, Seoul (KR)

(*) Notice: Subject to any disclaimer, the term of this patent is extended or adjusted under 35 U.S.C. 154(b) by 84 days.

(21) Appl. No.: 10/749,229

(22) Filed: Dec. 30, 2003

(65) Prior Publication Data

US 2005/0083188 A1 Apr. 21, 2005

(30) Foreign Application Priority Data

Oct. 21, 2003 (KR) ................................. 10-2003-0073408

(51) Int. Cl.[7] .................................................. B60Q 1/00
(52) U.S. Cl. .................... 340/439; 340/425.5; 340/438; 116/208
(58) Field of Search ............................. 340/438, 439, 340/668, 686, 425.5, 671, 672, 547–549, 551; 73/116, 119; 200/61.18, 61.4; 116/208; 307/9.1, 10.1

(56) References Cited

U.S. PATENT DOCUMENTS 4,087,800 A * 5/1978 Lee ............................. 340/676
5,426,362 A * 6/1995 Ninnis ......................... 324/235
6,181,239 B1 * 1/2001 Ahmed ........................ 340/438
6,523,400 B1 * 2/2003 Ahmed ...................... 73/119 R
6,532,810 B1 * 3/2003 Ahmed ...................... 73/119 R

FOREIGN PATENT DOCUMENTS

JP         09-060694          4/1997

* cited by examiner

Primary Examiner—Daniel Wu
(74) Attorney, Agent, or Firm—Morgan Lewis & Bockius LLP

(57) ABSTRACT

The warning apparatus includes magnetic force generating units, each oppositely arranged about a timing belt to generate a mutually opposite polarity of a magnetic force. A voltage inducing unit is disposed at one lateral surface of the timing belt to induce a voltage in response to the magnetic force generated from the magnetic force generating units. A voltage detecting unit detects the voltage induced by the voltage inducing unit. A controller outputs a control signal for generating a warning signal when the voltage detected by the voltage detecting means is less than an established level. A warning generating unit generates an alarm that a replacement time of a timing belt has arrived in response to the control signal from the controller, such that when a timing belt is worn to a degree of breakage, a warning signal is given by a detection thereof so that a healthy timing belt should not be changed periodically.

9 Claims, 3 Drawing Sheets

# WARNING APPARATUS FOR SIGNALING WEAR AND TEAR OF TIMING BELT IN ENGINE

CROSS-REFERENCE TO RELATED APPLICATIONS

This application claims priority of Korean Application No. 10-2003-0073408, filed on Oct. 21, 2003, the disclosure of which is incorporated fully herein by reference.

FIELD OF THE INVENTION

The present invention relates to a warning apparatus for signaling wear and tear of a timing belt in a vehicle. The warning apparatus signals a user to replace the timing belt.

BACKGROUND OF THE INVENTION

Generally, timing belts are utilized for driving a camshaft in an internal combustion engine by interacting a rotation of a crank shaft with a rotation of a cam shaft. Such engine's may be severely damaged when timing belts are worn down by an unbalanced timing between an engine valve system and a piston system. Accordingly, it is essential that timing belts are replaced before they break and are no longer operable.

However, there is a drawback in the timing belts thus described in that the timing belts are shielded by a cover, making it difficult to check with the naked eye if they are worn. As a result, undamaged timing belts generally replaced at a prescribed period without, thereby incurring avoidable expenses. Also, the timing belts may break without any indication that the timing belts have been severely worn, thereby resulting in engine damage.

SUMMARY OF THE INVENTION

The present invention provides a warning apparatus for signaling wear and tear of a timing belt in an engine in order for a user to timely replace the worn timing belt before it breaks. In accordance with a preferred embodiment of the present invention, the warning apparatus for signaling wear and tear of an engine timing belt comprises magnetic force generating means or magnetic field generators each oppositely arranged about a timing belt to generate a mutually opposite polarity of magnetic force. A voltage inducing means is disposed at one lateral surface of the timing belt to induce a voltage in response to the magnetic force generated from the magnetic force generating means. A voltage detecting means or voltage detector detects the voltage induced by the voltage inducing means. A controller outputs a control signal for generating a warning signal when the voltage detected by the voltage detecting means is less than an established level. A alarm or warning generating unit generates a signal that it is time for the timing belt to be replaced in response to the control signal from the controller.

Preferably, the voltage inducing means may comprise a pair of first conductors, each distantly disposed on one lateral surface of the timing belt in a longitudinal direction thereof, and a plurality of second conductors, each disposed on one lateral surface of the timing belt in the longitudinal direction thereof. Both ends of each second conductor is respectively connected to the pair of the first conductor.

Preferably, the voltage detecting means may comprise a rotating body whose peripheral surface is surface-contacted with a lateral surface of the timing belt to rotate thereon, a pair of conductor belts disposed at a peripheral surface of the rotating body to respectively surface-contact the pair of first conductors, a connecting unit electrically connected to the pair of conductor belts, and a voltage meter detecting a voltage between the pair of conductor belts via a connecting unit.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENT

The preferred embodiment of the present invention will now be described in detail with reference to the annexed drawings. The present embodiment should not limit the scope of the present invention, and is described for illustrative purposes only.

Figure 1:
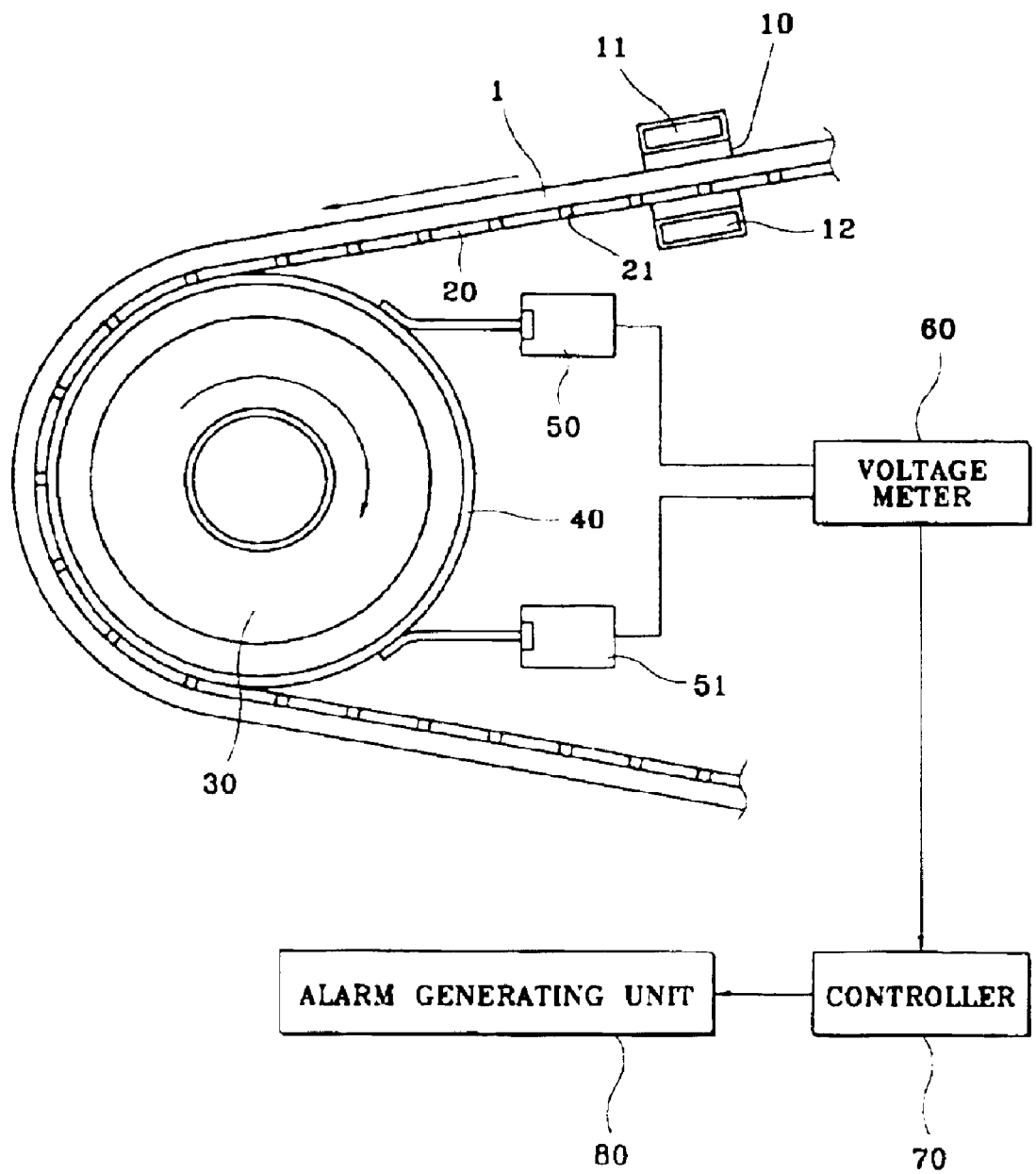
FIG. 1 is a schematic block diagram for illustrating a warning apparatus for signaling wear and tear of a timing belt in an engine according to an embodiment of the present invention.
Figure 2:
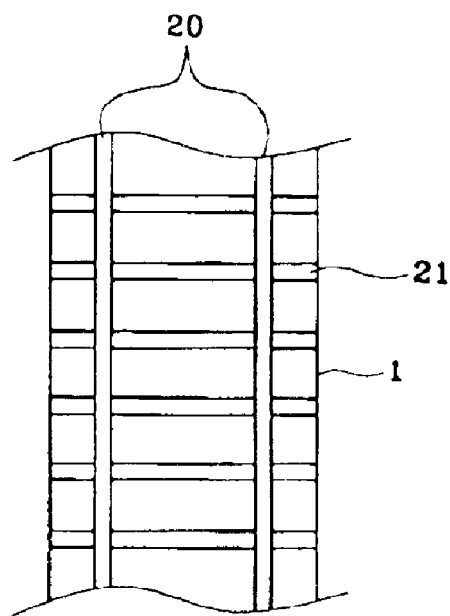
FIG. 2 is an enlarged drawing of essential parts of a timing belt of FIG. 1.
Figure 3:
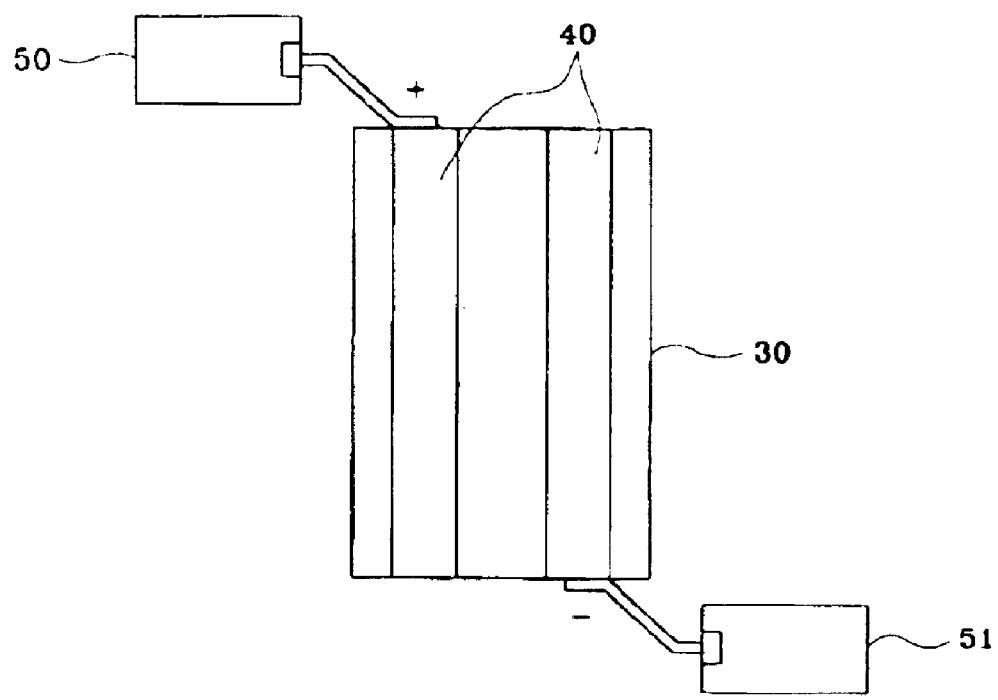
FIG. 3 is a side view of an idler of FIG. 1.

As shown in FIGS. 1, 2 and 3, a warning apparatus for signaling wear and tear of a timing belt in an engine includes a timing belt 1, magnetic force generating means 10, a pair of first conductors 20, a plurality of second conductors 21, a rotating body 30, a pair of conductor belts 40, a pair of connecting units 50 and 51, a voltage meter 60, a controller 70, and an alarm generating unit 80.

The timing belt 1 is mounted at a timing belt system of an engine for coupling rotation of a cam shaft with rotation of a crank shaft. The magnetic force generating means 10 includes a pair of permanent magnets arranged about the timing belt 1, each having an opposite polarity, to allow a magnetic force to pass through the timing belt 1.

The pair of first conductors 20 are respectively arranged on a lateral surface of the timing belt 1 in the longitudinal direction of the timing belt. The pair of first conductors 20 is preferably disposed opposite to one another. Furthermore, the pair of the first conductors 20 are preferably disposed at an area adjacent to both edges of the timing belt 1, such that an abraded condition just before breakage of the timing belt 1 can be immediately detected.

The plurality of second conductors 21 are respectively arranged on a lateral surface of the timing belt 1 in the longitudinal direction thereof. Each end of the second conductors is connected to the pair of the first conductors 20.

The peripheral surface of the rotating body 30 tightly contacts the first conductors 20 and the second conductors 21 mounted on the lateral surface of the timing belt 1. By way of example, the rotating body 30 may be an idler mounted on a timing belt system of an engine for forming a contact angle with the timing belt 1 or providing appropriate tension. The pair of conductor belts 40 are respectively mounted on a peripheral surface of the rotating body 30 to contact the surface of the pair of first conductors equipped at the timing belt 1 and to conduct electricity.

The pair of connecting units 50 and 51 are respectively connected to a pair of conductor belts 40 equipped at a peripheral surface of the rotating body 30. The pair of connecting units 50 and 51 apply voltage applied to the pair of conductor belts 40 to the voltage meter 60.

By way of example, as shown in FIGS. 1 and 2, the connecting units 50 and 51 may be any type of devices, as long as they connect electrically to a rotating object. For example, they may be brush type conductors, rollers rotating in cooperation with the rotating body 40, or the like.

The voltage meter 60 detects the voltage between the pair of conductor belts 40 equipped at the rotating body 30, via the connecting units 50 and 51, to output a detected signal corresponding thereto. The controller 70 receives the detected signal outputted from the voltage meter 60 detecting the voltage between the pair of conductor belts 40 mounted at the rotating body 30, and outputs a control signal for generating a warning signal if the detected voltage is less than an established level.

The alarm generating unit 80 generates a warning signal for notifying a user that the timing belt should be replaced, in response to the control signal outputted from the controller 70. The unit 80 may be, for example, a buzzer for outputting a warning sound, a warning lamp, or an indicating element for indicating a warning comment.

An operational example of the present invention will now be described in detail with reference to the accompanying drawings.

Figure 4:
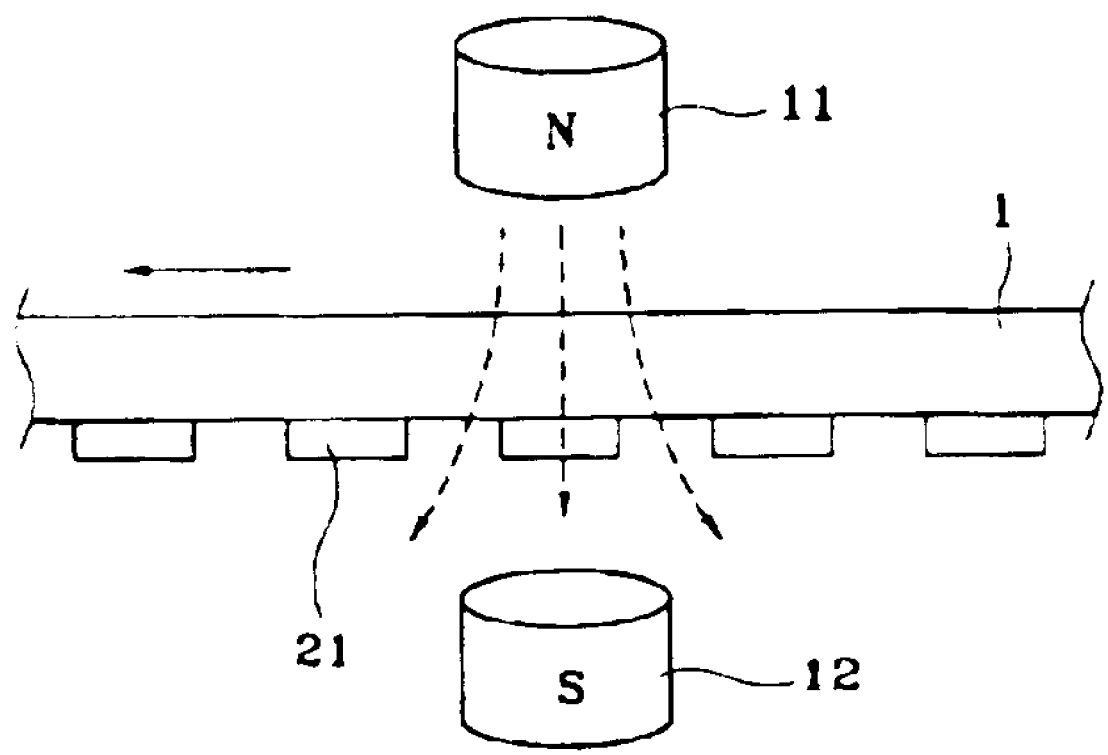
FIG. 4 is a schematic drawing depicting an operational principle of the present invention.

Referring to FIG. 4, when an engine starts to move the timing belt 1, the timing belt 1 passes through the magnetic force generated between the permanent magnets 11 and 12 of the magnetic force generating means 10 to cause induced electromotive force to be generated in the plurality of second conductors 21 at the timing belt 1 in response to Fleming's right-hand law. This induces a current, such that the voltage difference between the pair of the first conductors 20 becomes identical with that between both ends of the plurality of second conductors 21. For instance, when a conductor disposed in a magnetic field is moved by an external force, an induced current flows in the conductor, where Fleming's right-hand law is defined by a conductor's moving speed, a direction of the magnetic field and a direction of the current. The Fleming's right-hand law is the principle of a generator.

According to Fleming's right-hand law, an induced electromotive force (E) is defined by a vector product of motion (F) and magnetic flux (B), where the induced electromotive force induced on the second conductor 21 grows larger in proportion to the speed of the timing belt 1.

The voltage between the pair of first conductors 20 equipped at the timing belt 1 is detected by the voltage meter 60 via the pair of conductor belts 40 and the pair of connecting units 50 and 51, from which a detected signal corresponding to a voltage level detected by the voltage meter 60 is outputted. The controller 70 detects the voltage between the pair of the first conductors 20 disposed at the timing belt 1 in response to the detected signal outputted from the voltage meter 60. The controller 70 then compares the detected voltage with the established level, and determines that the timing belt 1 is fine if the detected voltage is above the established level.

Abrasion of the timing belt 1 starts from both edges thereof, and if the timing belt 1 is so abraded as to break, the pair of the first conductors 20 arranged near both edges of the timing belt 1 will break and/or cut off. When the first conductors 20 of the timing belt 1 break, a circuit to the voltage meter 60 is opened via the second conductors 21, the first conductors 20, the conductor belt 40 and the connecting units 50 and 51 such that the induced electromotive force induced on the second conductors 21 is not detected and a voltage of less than the established level is detected by the voltage meter 60.

If the voltage detected by the voltage meter 60 is less than the established level, the controller 70 determines that the timing belt 1 is worn, broken, and/or has snapped and outputs a control signal for generating a warning signal. When a warning signal is generated from the alarm generating unit 80 notifying that it is time to replace the timing belt in response to the control signal from the controller 70, a driver or a maintenance person can easily perceive that it is time to replace the timing belt.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

As apparent from the foregoing, there is an advantage in the warning apparatus for signaling wear and tear of a timing belt in an engine thus described according to the embodiment of the present invention in that, when a timing belt is worn to the point that it is badly damaged, a warning signal is given by a detection thereof such that a n undamaged timing belt does not need to be changed periodically. This reduces the expenses for replacing undamaged timing belts and severe damage to an engine, caused by a worn timing belt not being timely replaced, can be prevented.

What is claimed is:

1. A warning apparatus for signaling wear and tear of a timing belt in an engine, the engine mounted with a timing belt for interacting a rotation of a crank shaft with a rotation of a cam shaft, the apparatus comprising:

magnetic force generating means each oppositely arranged about a timing belt to generate a mutually opposite polarity of a magnetic force;

voltage inducing means disposed at one lateral surface of said timing belt to induce a voltage in response to the magnetic force generated from said magnetic force generating means;

voltage detecting means for detecting the voltage induced by said voltage inducing means;

a controller for outputting a control signal for generating a warning signal when the voltage detected by said voltage detecting means is less than an established level; and a warning generating unit for generating an alarm that a replacement time of a timing belt has arrived in response to the control signal from said controller.

2. The apparatus as defined in claim 1, wherein said voltage inducing means comprises:

a pair of first conductors, each distantly disposed on one lateral surface of said timing belt in a longitudinal direction thereof; and a plurality of second conductors each disposed on one lateral surface of said timing belt in the longitudinal direction thereof, both ends of each second conductor being respectively connected to the pair of said first conductors.

3. The apparatus as defined in claim 2, wherein said voltage detecting means comprises:

a rotating body whose peripheral surface contacts a lateral surface of said timing belt;

a pair of conductor belts disposed at a peripheral surface of said rotating body to respectively contact said pair of first conductors;

a connecting unit electrically connected to said pair of conductor belts; and a voltage meter detecting a voltage between said pair of conductor belts via said connecting unit.

4. The apparatus as defined in claim 3, wherein said rotating body is an idler mounted on a timing belt system of an engine for forming a contact angle to said timing belt or providing tension.

5. A warning apparatus for signaling wear of a timing belt, comprising:

a magnetic field generator arranged adjacent a timing belt;

at least one conductor disposed on a lateral surface of said timing belt and configured to induce a voltage in response to a magnetic field generated by said at least one conductor moving past said magnetic field generator;

a voltage detector coupled to said at least one conductor and configured to detect a voltage induced in said conductor by said magnetic field generator; and a controller coupled to said voltage detector and configured to generate a control signal when the voltage detected by said voltage meter is less than an established level.

6. The warning apparatus of claim 5, further comprising an alarm generating unit for generating an alarm that said timing belt should be replaced in response to the control signal from said controller.

7. The apparatus as defined in claim 5, wherein said at least one conductor comprises:

a pair of first conductors, each distantly disposed on one lateral surface of said timing belt in a longitudinal direction thereof; and a plurality of second conductors each disposed on one lateral surface of said timing belt in the longitudinal direction thereof, both ends of each second conductor being respectively connected to the pair of said first conductors.

8. The apparatus as defined in claim 5, wherein said voltage detector comprises:

a rotating body whose peripheral surface contacts a lateral surface of said timing belt;

a pair of conductor belts disposed at a peripheral surface of said rotating body to respectively contact said pair of first conductors;

at least one connecting unit electrically connected to said pair of conductor belts; and a voltage meter configured to detect a voltage between said pair of conductor belts via said at least one connecting unit.

9. The apparatus as defined in claim 8, wherein said rotating body is an idler mounted on a timing belt system of an engine for forming a contact angle with said timing belt or for providing tension.

* * * * *